United States Patent [19]

Williamson et al.

[11] Patent Number: 5,009,267

[45] Date of Patent: Apr. 23, 1991

[54] METHOD FOR TEMPORARILY REDUCING PERMEABILITY OF SUBTERRANEAN FORMATIONS

[75] Inventors: Charles D. Williamson, Houston; Stephan J. Allenson, Richmond; Robert K. Gabel, Houston, all of Tex.

[73] Assignee: Nalco Chemical Company, Naperville, Ill.

[21] Appl. No.: 578,883

[22] Filed: Sep. 7, 1990

Related U.S. Application Data

[62] Division of Ser. No. 272,237, Nov. 14, 1988.

[51] Int. Cl.$^5$ .............................................. E21B 43/27
[52] U.S. Cl. .................................. 166/271; 166/283; 166/285; 166/308; 166/280; 252/8.551
[58] Field of Search ..................... 282/8.551; 166/271, 166/283, 285, 308

[56] References Cited

U.S. PATENT DOCUMENTS

| | | | |
|---|---|---|---|
| 3,993,570 | 11/1976 | Jackson et al. | 252/8.51 |
| 4,067,389 | 1/1978 | Savins | 166/246 |
| 4,123,366 | 10/1978 | Sauber et al. | 252/8.51 |
| 4,151,096 | 4/1979 | Jackson | 252/8.51 |
| 4,247,402 | 1/1981 | Hartfiel | 252/8.51 |
| 4,652,384 | 3/1987 | Francis et al. | 252/8.51 |

*Primary Examiner*—Robert L. Stoll
*Assistant Examiner*—Chhaya Sayala
*Attorney, Agent, or Firm*—Laff, Whitesel, Conte & Saret

[57] ABSTRACT

A fluid loss control additive for aqueous fracturing media including a blend of two or more modified starches or a blend of one or more natural starches with one or more modified starches.

14 Claims, No Drawings

METHOD FOR TEMPORARILY REDUCING PERMEABILITY OF SUBTERRANEAN FORMATIONS

This is a divisional of co-pending application Ser. No. 07/272,237 filed on Nov. 14, 1988.

BACKGROUND OF THE INVENTION

This invention relates generally to an additive and a method for improving the efficiency of hydraulic fracturing operations conducted in subterranean formations penetrated by a wellbore. In particular, it relates to an additive for hydraulic fracturing media comprising blends of modified starches, and blends of modified and natural starches to control fluid loss without permanently plugging or otherwise damaging the formation.

It often becomes necessary or desirable to exploit modern technology to increase the rate of fluid flow in wellbores for the production of oil or gas. One common technique for increasing the rate of fluid flow involves fracturing the subterranean formation adjacent to the wellbore by pumping a fracturing fluid into the wellbore at a pressure sufficient to lift the overburden and fracture the formation. Proppants in the form of uniform size sand, phenolic resin coated sand, glass beads or sintered bauxite are pumped with the fracturing fluid and fill the fracture to prevent closure of the fracture once the pressure is released.

When this fracturing technique is used, it is most important to assure that the fracturing fluid does not penetrate into the formation, since such penetration will limit the efficiency of the fracturing process and damage the formation. Penetration of the fracturing fluid typically is controlled by incorporating a fluid loss control additive in the fracturing media.

A variety of different fluid loss control additives are known and used. These include finely divided inorganic solids such as silica flour, crushed limestone, rocksalt, talc, kaolin, and bentonite. Unfortunately, these materials are insoluble in both aqueous fluids and produced fluids, and therefore tend to permanently plate out and plug the faces of the formation exposed to the fracturing fluids, potentially impairing fracture conductivity and sharply decreasing the flow of fluids out of the formation and into the wellbore. Also, many known fluid control additives have poor "spurt loss" characteristics because the filter cake produced by the fluid control additives is too slow to form.

Another class of materials used to control fluid loss are natural starches. Natural starches are readily degraded, thereby eliminating the plugging problems of the inorganic materials. Unfortunately, natural starches, when used alone, are not effective fluid loss control additives because they provide poor spurt loss control and higher leak-off rates. As a result, natural starches have been combined with finely divided inorganic solids in an attempt to incorporate the desirable loss control characteristics of both materials in a simple fluid loss control additive composition. Unfortunately, the starch/inorganic additives still cause unacceptable plugging, and loss of fracture conductivity.

SUMMARY OF THE INVENTION

It is therefore an object of the present invention to provide fluid loss additives which help achieve the desired fracture geometry by lowering the spurt loss and leak-off rate of the fracturing fluid into the surrounding formation by rapidly forming a filter cake with low permeability.

It is another object of the present invention to provide effective fluid loss control additives which are readily degraded after the completion of the fracturing process.

Yet another object of the present invention is to provide a fluid loss control additive which is effective at low concentrations in the fracturing fluid.

A still further object of the present invention is to provide a fluid loss control additive which has a broad particulate size distribution ideal for use in effectively treating a wide range of formation porosities.

Still another object of the present invention is to provide a fluid loss control additive which does not damage proppant permeability.

Another object of the present invention is to provide a fluid loss additive which is easily dispersed in the fracturing fluid.

Yet another object of the present invention is to provide a fluid loss additive which is cost effective.

The present invention is therefore directed to new fluid loss control additives for hydraulic fracturing media which comprise blends of modified starches and blends of one or more modified starches and one or more natural starches. These blends have been found to maintain injected fluid within the created fracture far more effectively than natural starches. Yet, these new additives are subject to controlled degradation to soluble products by way of oxidation and bacterial attack by bacteria naturally present in the formation, which are particularly active at the elevated temperatures present at the well depths. The oxidation may be accelerated by adding oxidizing agents such as persulfates and peroxides. Thus, damage to the oil or gas producing formations upon completion of the fracturing operation is effectively eliminated.

The natural starches which may be used in combination with modified starches include any of the starches derived from corn, potato, wheat, rice, soy, tapioca, etc. The preferred natural starches are corn, potato and soy. The most preferred natural starch is corn starch.

The modified starches used in the present invention are derived from natural starches by chemically reacting natural starches with organic reactants. The modified starches used in the practice of this invention include carboxymethyl starch, hydroxyethyl starch, hydroxypropyl starch, acetate starch, sulfamate starch, phosphate starch, nitrogen modified starch, starches crosslinked with aldehydes, epichlorohydrin, borates, and phosphates, and starches grafted with acrylonitrile, acrylamide, acrylic acid, methacrylic acid, maleic anhydride, or styrene. Preferred among these starches are hydroxypropyl and carboxymethyl starches.

Optionally, the starches are coated with a surfactant to aid dispersion of the dry starch mixture into the fracturing fluid. Useful surfactants include lower HLB (lipophilic) surfactants in the HLB range of about 1–11, with the HLB range of 4–10 being preferred. Representative useful surfactants include sorbitan monooleate, polyoxyethylene sorbitan monooleate, ethoxylated butanol, and ethoxylated nonyl phenol, as well as various blends of these surfactants. The surfactants typically will be used at a level of about 0.1 to 10 percent by weight and preferably about 0.5 to 5%.

The fluid loss control additives of the present invention comprise either a blend of the above natural and modified starches, or a blend of two or more modified starches. The inventors have discovered that they can obtain outstanding fluid loss control, without damaging the surrounding subterranean formation, since all of the components of the fluid control additive will be degraded or solubilized in the wellbore fluids and the fluid surrounding the wellbore will return promptly after the fracturing process is completed.

The performance of the invention is dependent on the natural porosity of the well formation and on such characteristics of the individual starches and modified starches as particle size, shape, degree of swelling, solubility, etc. For example, useful fluid loss control additives of the invention may have particle sizes ranging from about 5 to about 550 microns. Shapes can be round, round polygonal, round lenticular or truncated oval. Swelling can range from about 10 percent to about 50 percent. The higher swelling starches are preferred because they absorb many times their weight in water to form a gel film which helps to trap less soluble starch particles to form a more effective filter cake.

It has been found that when a blend of natural and modified starches is used, the blend should contain a ratio by weight of up to about 9:1 of natural starches to modified starches. The most preferred range is from about 3:7 to 7:3 of natural starches to modified starches. The most preferred compositions discovered thus far, contain a weight ratio of natural starches to modified starches of about 1 to 1.

A preferred fluid loss additive in accordance with the present invention would comprise:

| Component | Weight Percent |
|---|---|
| Pregelantinized corn starch | 29.250 |
| Hydroxypropyl carboxymethyl potato starch | 29.250 |
| Hydroxypropyl distarch phosphate potato starch | 19.500 |
| Soy flour | 19.500 |
| Sorbitan monooleate | 1.250 |
| Ethoxylated butanol | 0.625 |
| Ethoxylated nonyl phenol | 0.625 |
| | 100.00 |

The fluid loss additive is dispersed in the fracturing media to be pumped downhole. The additive is dispersed by mixing with the fracturing fluid, which is usually water but may also be an oil-based fluid such as gelled diesel, kerosene or crude oil.

Although the concentration of additive will be varied depending on the porosity and other characteristics of the particular formation, typically from about 10 to 75 lbs/1000 gal of the additive is dispersed in the fracturing media. In a preferred embodiment from about 20 to 60 lbs/1000 gal weight of the additive is used and in a most preferred embodiment 40 lbs/1000 gal of the additive is used.

As the fracture is created, the fluid loss control additive is deposited on the walls of the fracture to form a filter cake which controls the leak-off rate and confines the fluid to the fracture, effectively increasing the fracture area. Therefore, with the same fluid volume, a longer fracture is obtained.

EXAMPLES

1. A series of blends of natural and modified starches as set out in TABLE I below were tested to determine their fluid loss control characteristics. A Baroid Filter Press No. 38751 was used in the test with nitrogen gas as the pressure source. Two 2½-inch papers (Baroid's 988 or Whatman's 50) were used as the filter medium.

The standard fluid loss test was run at 1,000 psi at 75° F. The standard base fluid was 20 pounds of hydroxypropyl guar (HPG) per 1,000 gallons of 2% KCl.

A 150 ml sample of the base fluid was placed in a Waring blender and slow agitation was initiated. The sample fluid loss additive was slowly introduced to the base fluid over period of approximately 5 seconds. Agitation continued at medium speed for 30 seconds.

The fluid mixture was then poured into the filter cell to ½ inch from the top and the two filter papers were positioned on top. The cell was then closed, inverted, and placed in the stand. The top valve stem was opened, followed by opening of the bottom valve and the start of timing, with fluid loss results as reported in TABLE I.

TABLE I

| STARCH SAMPLE | FLUID LOSS (mls in 25 min.) |
|---|---|
| 1. Pregelantinized corn starch | 41.5 |
| 2. Soy flour | 36.5 |
| 3. Rice flour | 103.0 |
| 4. Corn starch | dry cell |
| 5. Carboxymethyl corn (crosslinked) | 88.0 |
| 6. Hydroxypropyl distarch phosphate potato | 79.0 |
| 7. Hydroxypropyl corn | 119.0 |
| 8. Hydroxypropyl potato | 70.0 |
| 9. Hydroxypropyl carboxymethyl potato | 45.0 |
| 10. Cationic potato | 48.0 |
| 11. Cationic corn | 49.0 |
| 12. Hydroxypropyl waxy corn | dry cell |
| 13. Carboxymethyl potato | dry cell |

Samples of the above starches were blended in proportions as set forth in TABLE II below, and subjected to the same test procedure, with results as reported in TABLE II.

TABLE II

| STARCH BLEND | Weight % of Components | | | | | | | | | | | FLUID LOSS (mls in 25 min.) |
|---|---|---|---|---|---|---|---|---|---|---|---|---|
| | 1 | 2 | 3 | 4 | 5 | 6 | 7 | 8 | 9 | 10 | 11 | |
| A | 30 | 20 | 20 | — | — | 30 | — | — | — | — | — | 24.0 |
| B | 30 | 20 | — | — | — | 20 | — | — | 30 | — | — | 15.0 |
| C | 30 | 20 | 20 | — | — | — | — | — | 30 | — | — | 36.0 |
| D | 30 | — | — | — | — | 20 | — | — | 30 | 20 | — | 16.0 |
| E | 30 | — | — | — | — | 20 | — | — | 30 | — | 20 | 24.0 |
| F | 40 | 30 | — | — | — | — | — | — | 30 | — | — | 26.5 |
| G | 30 | 20 | — | — | — | — | — | 20 | 30 | — | — | 25.5 |
| H | 30 | 20 | — | — | 20 | — | — | — | 30 | — | — | 22.5 |
| I | 30 | 20 | — | — | 10 | — | — | 10 | 30 | — | — | 22.0 |
| J | 50 | 30 | — | — | 10 | — | — | — | 10 | — | — | 29.5 |
| K | 50 | 10 | — | — | — | 10 | — | — | 30 | — | — | 29.0 |
| L | 10 | 50 | — | — | — | 10 | — | — | 30 | — | — | 26.0 |

These results demonstrate that blends of the natural and modified starches and blends of two or more modified starches achieve far superior fluid loss control characteristics than either of the components produce alone.

While particular embodiments of the invention have been shown and described, it would be obvious to those skilled in the art that various changes and modifications may be made therein without departing from the spirit and scope of the invention and, therefore, it is intended in the appended claims to cover all such changes and modifications which fall within the true spirit and scope of the invention.

What we claim is:

1. An improved method for hydraulic fracturing of subterranean formations penetrated by a wellbore comprising:

dispersing in a fracturing media a fluid loss additive to form an improved fracturing media, said fluid loss additive comprising a blend of two or more modified starches; and pumping the improved fracturing media into a wellbore at a pressure sufficient to lift the overburden and fracture the formation, whereby a filter cake with low permeability will be rapidly formed, said filter cake being readily degraded after completion of the fracturing process.

2. The method of claim 1 wherein the modified starches are chosen from the group consisting of carboxymethyl starch, hydroxyethyl starch, hydroxypropyl starch, acetate starch, sulfamate starch, phosphate starch, nitrogen modified starch, starches crosslinked with aldehydes, epichlorohydrin, borates, and phosphates, and starches grafted with acrylonitrile, acrylamide, acrylic acid, methacrylic acid, maleic anhydride, or styrene.

3. The method of claim 1 wherein the starches are coated with from about 0.1 to 10% by weight of a surfactant.

4. The method of claim 1 wherein the surfactant is chosen from the group consisting of sorbitan monooleate, polyoxyethylene sorbitan monooleate, ethoxylated butanol, and ethoxylated nonyl phenol.

5. The method of claim 1 wherein from about 10 to 75 pounds of the fluid loss additive is dispersed in 1,000 gallons of fracturing media.

6. The method of claim 1 wherein from about 20 to 60 pounds of the fluid loss additive is dispersed in 1,000 gallons of fracturing media.

7. The method of claim 1 wherein from about 40 pounds of the fluid loss additive is dispersed in 1,000 gallons of fracturing media.

8. An improved method for hydraulic fracturing of subterranean formations penetrated by a wellbore comprising:

dispersing in a fracturing media a fluid loss additive to form an improved fracturing media, said additive comprising a blend of one or more natural starches and one or more modified starches; and pumping the improved fracturing media into a wellbore at a pressure sufficient to lift the overburden and fracture the formation, whereby a filter cake with low permeability will be rapidly formed, said filter cake being readily degraded after completion of the fracturing process.

9. The method of claim 8 wherein the modified starches are chosen from the group consisting of carboxymethyl starch, hydroxyethyl starch, hydroxypropyl starch, acetate starch, sulfamate starch, phosphate starch, nitrogen modified starch, starches crosslinked with aldehydes, epichlorohydrin, borates, and phosphates, and starches grafted with acrylonitrile, acrylamide, acrylic acid, methacrylic acid, maleic anhydride, or styrene.

10. The method of claim 8 wherein the starches are coated with from about 0.1 to 10% by weight of a surfactant.

11. The method of claim 8 wherein the surfactant is chosen from the group consisting of sorbitan monooleate, polyoxyethylene sorbitan monooleate, ethoxylated butanol, and ethoxylated nonyl phenol.

12. The method of claim 8 wherein from about 10 to 75 pounds of the fluid loss additive is dispersed in 1,000 gallons of fracturing media.

13. The method of claim 8 wherein from about 20 to 60 pounds of the fluid loss additive is dispersed in 1,000 gallons of fracturing media.

14. The method of claim 8 wherein from about 40 pounds of the fluid loss additive is dispersed in 1,000 gallons of fracturing media.

* * * * *